United States Patent [19]

Eckhardt

[11] 3,841,814
[45] Oct. 15, 1974

[54] APPARATUS FOR PROCESSING PLASTIC MATERIALS
[76] Inventor: Hans A. Eckhardt, 55 Cresent Bend, Allendale, N.J. 07401
[22] Filed: Apr. 3, 1972
[21] Appl. No.: 240,444

[52] U.S. Cl............... 425/208, 425/381.2, 259/6, 259/105, 259/191, 259/192
[51] Int. Cl.............................................. B29f 3/02
[58] Field of Search ............ 425/208, 381.2; 259/5, 259/6, 21, 40, 41, 64, 105, 191, 192

[56] References Cited
UNITED STATES PATENTS

| | | | |
|---|---|---|---|
| 2,765,490 | 10/1956 | Zona | 259/191 |
| 3,343,212 | 9/1967 | Adams | 425/381.2 |
| 3,633,494 | 1/1972 | Schippers | 425/208 X |
| 3,676,035 | 7/1972 | Eckhardt | 425/242 X |

*Primary Examiner*—R. Spencer Annear

[57] ABSTRACT

An apparatus for extruding, injection molding, blow molding and transfer molding plastic materials comprises a feed screw rotating in a barrel and feeding plastic material over a revolving member surrounded by an increasing and a decreasing housing with a discharge opening at its center. The revolving member has an increasing surface with an axis which has a radial distance to the center line of the increasing housing. The revolving member has a subsequent decreasing surface with that axis which has a radial distance to the middle line of the decreasing housing diametral to the radial distance from the center line of the increasing housing surface to that axis of revolution, so that the forces developed in an area of decreasing surfaces are compensated by forces in a diametral area of increasing surfaces. The increasing surfaces diverge from each other as do the decreasing surfaces. The increasing housing, the decreasing housing and the revolving member are axially movable relatively to each other to vary the spaced relationship between their surfaces. For extrusion, an extrusion barrel is attached to the decreasing housing, and an extrusion screw to the revolving member. For molding operations, an injection screw or an injection piston extends through a bore in the revolving member coaxial with the member's axis of revolution.

22 Claims, 8 Drawing Figures

PATENTED OCT 15 1974 3,841,814

APPARATUS FOR PROCESSING PLASTIC MATERIALS

BACKGROUND OF THE INVENTION

The present invention relates to apparatus for processing plastic materials, and in particular to apparatus and methods for extruding, injection molding, blow molding, transfer molding, and otherwise transforming plastic materials.

To extrude, injection mold, blow mold, and transfer mold plastic material it is necessary to heat, compress, mix, disperse, shear, work, degas and convey the material, and it is combinations of these treatments which will be referred to in this specification as processing. Plastic materials are defined in this specification as materials exhibiting viscous as well as elastic behavior while being processed.

For extruding, injection molding, blow molding, and transfer molding of plastic materials screw machines have been in use for a long time, primarily consisting of a barrel with a cylindrical bore, a die at one end, a feed opening at the other end, and one or more screws rotating therein with close clearance. In spite of many improvements, for example in screw design, these conventional screw extruders often perform the task of processing not efficiently or uniformly, one of the reasons being that screw machines have been acknowledged to be suitable means for conveying and compressing, but much less for efficient, measured and uniform heating, mixing, dispersing, shearing and working.

There are other extruders known which employ two parallel plates, one of them rotating, wherein the plastic material is worked in the space between the flat opposite faces of these plates, and is discharged through a central orifice in the stationery plate. These extruders make use of a natural phenomenon, the normal force effect, which has been described in the scientific literature during the past few decades. The most widely known illustration of the normal force effect has been given by K. Weissenberg in "Nature", Mar. 1, 1947, Vol. 159, p. 310-311, and a detailed description of applications in "Modern Plastics" magazine of October, 1959, page 107, in an article of Bryce Maxwell and Anthony J. Scalora. Machines built along these lines have been called centripetal extruders, or elastic melt extruders.

While centripetal extruders offer several advantages, their practical application has been very limited by a number of drawbacks. One of the disadvantages is the fact that at the start-up the plastic material particles fed in the form of powder, flake, beads or granules fall downward within the air space between the rotating and the stationary surface to the bottom of the heating chamber where they often cake together to such an extent that they are not brought back up between the rotating and the stationary surface even by auxiliary means, and prevent further uniform feeding. Another drawback is that other plastic material particles reach the center of the two plates without having undergone suitable conditions of temperature, pressure, and mechanical working, and therefore constitute portions of lower temperature and higher viscosity in the extrudate which thus becomes unusable. Oftentimes the die orifice is getting clogged by such harder and colder particles.

A further disadvantage is that the plastic material fed in the form of powder, flake, beads or granules has, for some time after entering the space between the rotating and stationary disks, neither a viscous nor an elastic behavior, and therefore is more exposed to gravitational forces letting it fall through to the bottom of the heating chamber, and to centrifugal forces preventing continuous and uniform feeding of material than to centripetal forces as desired. In addition, with bigger machines having larger plate diameters, even such particles which have achieved elastic and viscous properties, are travelling at such a large diameter arc that the centripetal effect is unable to overcome the centrifugal forces, thus interrupting the desirable uniform spiral flow toward the center.

Another known device uses a screw to feed plastic material in the space between the smaller ends of a conical stator and a conical rotor, sometimes equipped with ribs. Such devices have been found to be suitable only for a very small number of plastic materials, for about one type out of one hundred, while all the other plastic material types have shown excessive decomposition and overheating a short time after the start-up, thus rendering the device unusable. Even with one of the few applicable materials the product emerges from the unobstructed cylindrical space in form of irregularly shaped chunks which require an additional extruder or injection molding machine for final processing. If an extruder is attached, the irregularly shaped chunks have to be restructed in their unimpeded exit from the annular space in order to emerge only at a small segment at the top of the annular space from where they drop into the extruder chute; they suffer considerable heat losses, undesirable oxygen contact due to the difficulties in effectively enclosing such aggregate equipment for evacuating and purging, and oftentimes agglomeration of the sticky, tacky chunks in the extruder chute, thus interrupting continuous extrusion.

Another well known device for processing plastic materials is a two roll mill, with plastic material fed to the adjustable nip wherein it is worked quite effectively. However, the two roll mill is not considered to be a modern continuous processing machine because of the batch operation, the dependence on human skills, the high pressures developed in the linear nip and the exposure to oxygen.

SUMMARY OF THE PRESENT INVENTION

The present invention is directed to an apparatus for processing plastic materials which eliminates the difficulties heretofore described. The invention provides apparatus which pressure feeds the particular material to an adjustable annular space of increasing circumference having a width varying over the circumference between a maximum and minimum width, so that a wide variety of plastic materials, including heat sensitive materials, can be sheared, worked, mixed and dispersed reliably and effectively.

The apparatus of the invention feeds the sheared and worked plastic material from the entire circumference of the annular space of increasing circumference, without restriction to a small segment thereof, to the entire periphery of an annualr space of decreasing circumference with a width varying over that circumference diametrally to that of the increasing circumference, so that the processing pressures developed compensate each other in axial, radial and diametral directions.

The apparatus of the invention avoids heat losses and agglomeration of plastic material emerging from the annular space of increasing circumference and varying width, and provides apparatus for working the plastic material in a subsequent annular space of decreasing circumference and diametrally varying width. Furthermore the invention avoids oxygen contact and porosity of the plastic material, and subjects the plastic material to vacuum or a protective gas atmosphere by removing the air through a duct near the transition from the annular space of increasing varying circumference, to the annular space of decreasing varying circumference.

The apparatus of the invention prevents powder, flake, beads or granules from dropping through the air spaces between working surfaces to the bottom of a processing machine during start-up and shut-down periods, and provides processing spaces approaching zero width in a diametrally varying operation during such periods, so that the plastic material is worked in narrow, diametrally varying annular spaces. The invention avoids caking and agglomeration of plastic material particles in spaces outside the working surfaces of a processing machine, and provides apparatus having annular spaces of diametrally varying widths subjecting the plastic material to continuous flow in axial, radial and circular directions, thus eliminating stagnation.

The invention prevents material particles from reaching the discharge opening of a processing machine and clogging the die orifice without having undergone effective plastification by mechanical working, heat and pressure, and provides apparatus exposing the plastic material to sufficiently high shearing stresses, temperatures and pressures. The invention avoids material particles without viscous and elastic behavior entering the space between surfaces effecting centripetal movements, and provides apparatus subjecting only plastified material with viscous and elastic characteristics to centripetal processing.

The apparatus of the invention subjects plastic material to two different principles of mechanical working, by shearing, stretching, milling, kneading, mixing, and dispersing the material first in an increasing conical annular space between an increasing conical revolving member surface and an increasing conical housing surface disposed eccentrically to the axis of revolution, and subsequently in a decreasing conical annular space between a decreasing conical revolving member surface and a decreasing conical housing surface eccentric to the axis of revolution, with a circular roll mill treatment over the circumference of these surfaces taking place in a diametral manner so that the axial and radial forces compensate each other. The invention eliminates the aggregation of thrust loads and of radial forces in certain directions and provides apparatus compensating the rearward thrust by a forward thrust, and compensating radial forces in one direction by radial forces in the diametral direction.

The invention shortens the length of a processing machine and provides apparatus for working plastic material first in an annular conical space increasing in axial direction and subsequently in a conical annular space decreasing in reverse axial direction, with the widths of the two spaces varying diametrally with each other. The invention prevents plastified hot material from remaining in an irregular shape for any period of time and provides apparatus for uninterruptedly working the plastic material. Furthermore the invention eliminates the use of screws as main tools for shearing, kneading, mixing and dispersing plastic material, and provides apparatus for shearing, kneading, mixing and dispersing plastic material in annular conical spaces of increasing and subsequently decreasing circumferences, having radial widths varying diametrally over the circumferences, with a circumferential roll mill action taking place in these spaces, so that the minimum radial width of the increasing space is diametrally positioned to the minimum radial width of the decreasing space.

BRIEF DESCRIPTION OF THE DRAWINGS

The invention will be more particularly described in reference to the drawings wherein.

DESCRIPTION OF ILLUSTRATED EMBODIMENTS

Figure 1:
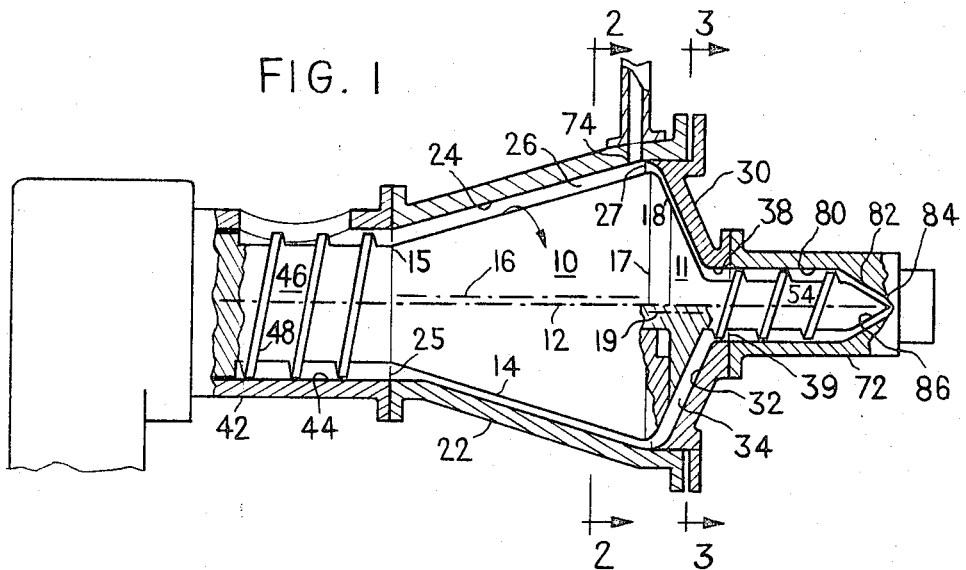
FIG. 1 is an elevational view, partly in section, showing one embodiment of the apparatus of the invention.
Figure 2:
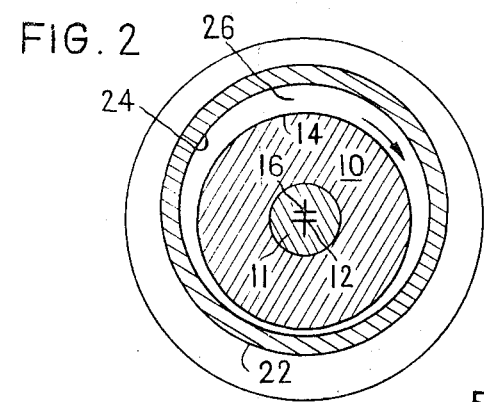
FIG. 2 is a sectional view taken along the lines 2—2 of FIG. 1, viewed in the direction of the arrows.
Figure 3:
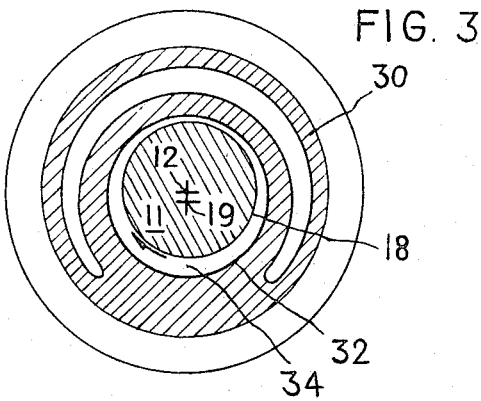
FIG. 3 is a sectional view taken along the lines 3—3 of FIG. 1.

Referring to the drawings, FIGS. 1, 2, 3, there is shown an apparatus for processing plastic material comprising an increasing housing 22 which has an interior surface 24 symmetric to the center line 16 thereof. The interior surface 24 has an interior circumference increasing from a first circumference, the housing entrance 25, to the large housing circumference 27. The increasing housing 22 is connected near the large housing circumference 27 to a decreasing housing 30 which has an interior surface 32 symmetric to the middle line 19 with an interior circumference decreasing from the large housing circumference 27 to the circumference 39 of a discharge opening 38 near the middle line of the decreasing interior surface 32.

A revolving member 10 is surrounded by the housings' interior surfaces 24 and 32 in spaced relationship to define a processing space 26 therebetween. The member 10 has a surface 14 increasing from a first circumference, the member entrance circumference 15, to the large member circumference 17, the increasing surface 14 being symmetric to the member axis 12. The revolving member 10 has a second, decreasing surface 18 connecting to the large member circumference 17 and surrounded by the decreasing interior surface 32 in spaced relationship to define a processing space 34 therebetween. The decreasing surface 18 has a circumference decreasing from said large member circumference 17 toward the member axis 12. The decreasing surface 18 is also symmetric to the member axis 12.

THe member 10 is revolvably mounted about the axis of revolution 12 from which the center line 16 of the increasing surface 24 has a radial distance, and from which the middle line 19 of the decreasing surface 32 has a radial distance in diametral direction. The means for revolving the member 10 are not shown.

The surface 24 of the increasing housing 22 has a gradual transition to the surface 32 of the decreasing housing 30, and the increasing surface 14 of the member 10 has a gradual transition to the decreasing surface 18 of the member 10.

TO vary and control the spaced relationship between the revolving member 10 and the housing surfaces 24 and 32, the revolving member 10, the increasing housing 22 and the decreasing housing 30 are axially movable relatively to each other, the means for exerting such axial movement being conventional and not shown.

Means for introducing plastic material in the processing space 26 near the entrance circumference 25 comprise a barrel 42 attached to the increasing housing 22 near the entrance circumference 25. The barrel 42 has an interior surface 44 symmetric to the member axis 12. A feed screw 46 having helical flights 48 extends through the barrel 42 and is connected to the revolving member 10 near the member entrance circumference 15.

The central portion 11 of the member decreasing surface 18 is mounted separately rotatable about an axis of rotation coincident with the member's axis of revolution 12 and having a radial distance from the middle line 19 of the member's peripheral decreasing surface 18. The central portion 11 is thus rotated independently at a rate different from the increasing surface 14 and the peripheral decreasing surface 18 by conventional means not shown.

An extrusion screw 54 coaxial to the member 10 is attached to the central portion 11 and extends through the discharge opening 38 in an extrusion barrel 72 which is attached to the decreasing housing 30 and has an interior surface 80 communicating with the discharge opening 38 and an extrusion opening 84.

The extrusion barrel's interior surface 80 decreases radially in axial direction in a tapering surface 82. The extrusion screw 54 has a taper 86 in spaced relationship and tapering correspondingly to the tapering surface 82. Since the processing space 34 is varied and controlled by moving axially the member 10 with the central portion 11 and the extrusion screw 54 relatively to the decreasing housing 30, the spaced relationship between the tapering surface 82 and the taper 86 is varied and controlled simultaneously.

In the interior surface 24 of the increasing housing 22, near the large housing circumference 27, an opening 74 is provided for devolatilizing gases and vapors, and for introducing additives to the plastic material to be processed.

Figure 4:
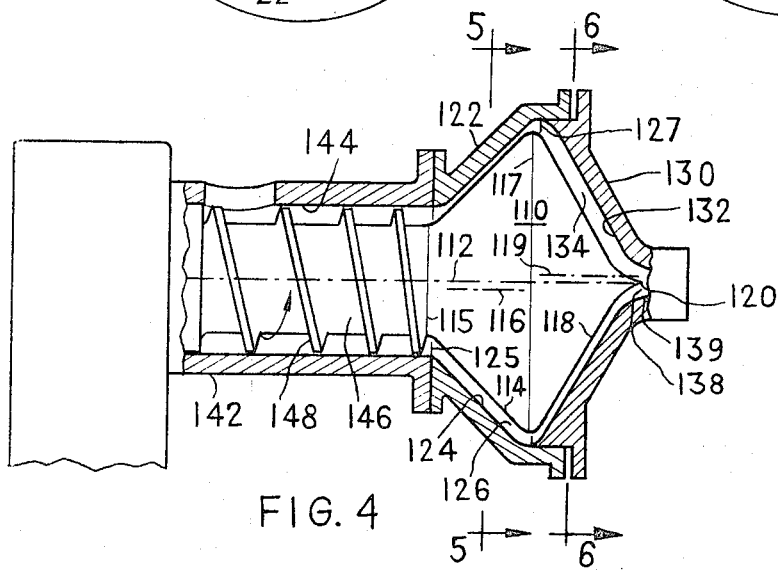
FIG. 4 is an elevational view, partly in section, of a further embodiment of the invention.
Figure 5:
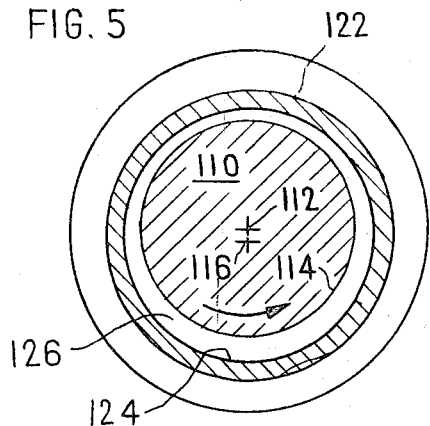
FIG. 5 is a sectional view along the lines 5—5 of FIG. 4 viewed in the direction of the arrows.
Figure 6:
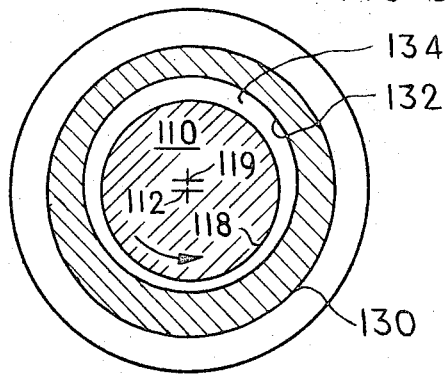
FIG. 6 is a sectional view along the lines 6—6 of FIG. 4.

In FIGS. 4, 5, 6, the apparatus for processing plastic material comprises an increasing housing 122 which has an interior surface 124 symmetric to the center line 116 thereof. The interior surface 124 has an interior circumference increasing from a housing entrance circumference 125 to a large housing circumference 127. THe increasing housing 122 is connected to a decreasing housing 130 which has an interior surface 132 symmetric to the middle line 119 with an interior circumference decreasing from the large housing circumference 127 to the circumference 139 of a discharge opening 138.

A revolving member 110 is surrounded by the interior surface 124 in spaced relationship to define a processing space 126 therebetween. The member 110 has a surface 114 increasing from a member entrance circumference 115 to a large member circumference 117, the increasing surface 114 being symmetric to the member axis 112. The member 110 has a decreasing surface 118 connecting to the large member circumference 117 and surrounded by the interior surface 132 in spaced relationship to define a processing space 134 therebetween. The decreasing surface 118 has a circumference decreasing from the large member circumference 117 toward the member axis 112 and is symmetric to the member axis 112 thereof.

The member 110 is revolvably mounted about the axis 112 from which the center line 116 of the increasing surface 124 has a radial distance, and from which the middle line 119 of the decreasing surface 132 has a radial distance in diametral direction. The decreasing surface 118 ends in a tip 120 which revolves.

To vary and control the spaced relationship between the revolving member 110 and the housing surfaces 124 and 132, the revolving member 110, the increasing housing 122 and the decreasing housing 130 are axially movable relatively to each other, the means for exerting such axial movement being conventional and not shown.

Means for introducing plastic material in the processing space 126 near the entrance circumference 125 comprise a barrel 142 attached to the increasing housing 122. The barrel 142 has an interior surface 144 symmetric to the member axis 112. A feed screw 146 having helical flights 148 extends through the barrel 142 and is connected to the revolving member 110 near the member entrance circumference 115.

Figure 7:
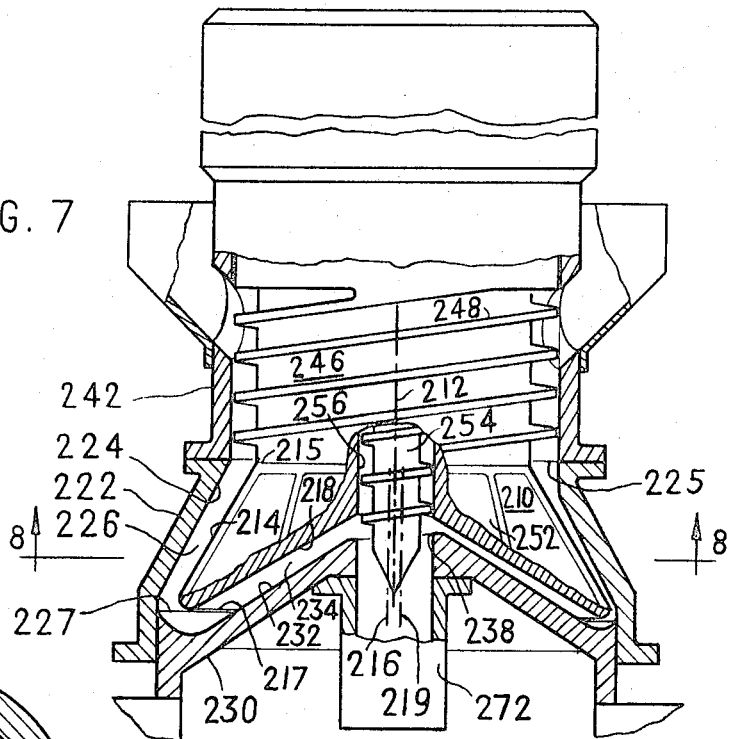
FIG. 7 is an elevational view, partly in section, of a further embodiment of the invention.
Figure 8:
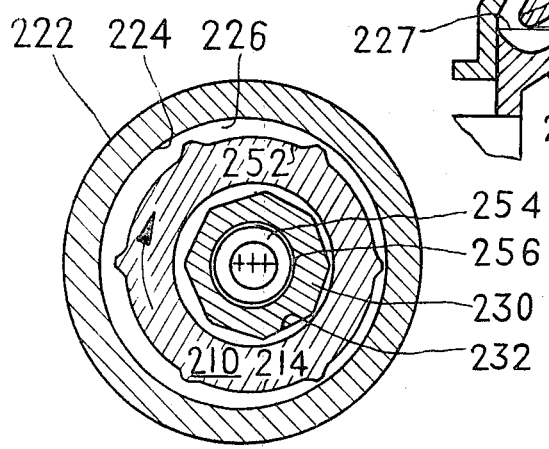
FIG. 8 is a sectional view along the lines 8—8 of FIG. 7.

FIGS. 7 and 8 show an apparatus comprising an increasing housing 222 which has an interior surface 224 symmetric to the center line 216 thereof. The interior surface 224 has a circumference increasing from a housing entrance circumference 225 to the large housing circumference 227. The increasing housing 222 is connected near the large housing circumference 227 to a decreasing housing 230 which has an interior surface 232 symmetric to the middle line 219 with an interior circumference decreasing from the large housing circumference 227 to a discharge opening 238 in the center of the decreasing interior surface 232.

A revolving member 210 is surrounded by the interior surface 224 in spaced relationship to define a processing space 226 therebetween. The member 210 has a surface 214 increasing from a member entrance circumference 215, to a large member circumference 217, the increasing surface 214 being symmetric to the member axis 212. The revolving member 210 has a second decreasing surface 218 connecting to the large member circumference 217 and surrounded by the interior surface 232 in spaced relationship to define a processing space 234 therebetween. The decreasing surface 218 has a circumference decreasing from the large member circumference 217 toward the member axis 212 and is symmetric to that axis 212.

The member 210 is revolvably mounted about the axis 212 from which the center line 216 of the increasing surface 224 has a radial distance, and from which the middle line 219 of the decreasing surface 232 has a radial distance in diametral direction. The means for revolving the member 210 are not shown.

The increasing surfaces 214, 224 of the member 210 and of the increasing housing 222 diverge by a small acute angle, and the decreasing surfaces 218, 232 of the member 210 and of the decreasing housing 230 also diverge by a small acute angle, so that they exert a force on the plastic material in the direction of their divergence.

The increasing surface 214 is provided with depressions 252 extending below the surface 214 so that the plastic material is processed between the surface 214 and the surface 224 in varying material depths. The depressions may have any form and may be shaped, for example, spirally so as to form helical depressions.

To vary and control the spaced relationship between the increasing member surface 214 and the increasing housing surface 224, and between the decreasing member surface 218 and the decreasing housing surface 232, the revolving member 210, the increasing housing 222 and the decreasing housing 230 are axially movable relatively to each other, the means for providing such axial movement being conventional and not shown.

Means for introducing plastic material in the processing space 226 comprise a barrel 242 attaached to the increasing housing 222 near the housing entrance circumference 225. A feed screw 246 having helical flights 248 extends through the barrel 242 and is connected to the member 210 near the entrance circumference 215.

The revolving member 210 has a cylindrical bore 256 coaxial to the member axis 212 from which the middle line 219 of the decreasing surface 232 has a radial distance. An injection screw 254 is mounted rotatably in and axially movable through the bore 256, the discharge opening 238, and the injection cylinder 272, by means which are conventional and not shown.

In the various embodiments the difference between the maximum distance and the minimum distance from the revolving member to the housing interior surfaces has been distinctly illustrated. It is understood that this difference between the maximum distance and the minimum distance may have any minute size which would be too small to show in the drawings. It is obvious to anyone skilled in the art that this can be easily achieved in practice by using a very minute radial distance of the housing center line and middle line to the member axis.

In the various embodiments the revolving member and the housing interior surfaces are shown for the purpose of illustration as having round cross sections. It is understood that these cross sections may have other shapes, and may be, for example, oblong, oval, octagonal, hexagonal, or may have any other regular or irregular form.

In the various embodiments there is a transition from the barrel surface 44 (144,244) which is symmetric to the axis 12 (112,212), to the housing surface 24 (124,224) which is symmetric to its center line 16 (116,216). It is obvious that over the length of this transition the interior housing surface 24 (124,224) is not symmetric to the center line 16 (116,216). For the same reason the surface 32 (132), in its transition to the discharge opening 38 (138), changes its symmetry to the middle line 9 (119) to a symmetry to the axis 12 (112).

Generally speaking, an apparatus for processing plastic material is usually provided with means for heating and cooling, for measuring and recording temperatures, pressures, flow rates and other variables. Such means are not shown in the various embodiments, since their illustration and description would obstruct the drawings and their description. It is obvious to anyone skilled in the art that the apparatus of the invention is provided with known means for heating and cooling, measuring and recording of temperatures, pressures, flow rates and other variables. Such means may include, for example, flow passages for heating and cooling fluids in housings, barrels, revolving members and screws, or revolving elements connected thereto.

In the various embodiments, several surfaces are shown to be provided for sealing against plastic material, or gases, or hydraulic fluids. The seals, however, are not shown because of their size and for better clarity. Also not shown are bolts, screws, and nuts to connect parts shown as being connected, for example shown as being provided with flanges for such connections.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. Apparatus for processing plastic material comprising an increasing housing having an interior surface symmetric to the center line thereof, said interior surface having an interior circumference increasing from a first circumference, the housing entrance circumference, to the large housing circumference;

a revolving member surrounded by said housing interior surface in spaced relationship to define a processing space therebetween, said member having a surface increasing from a first circumference, the member entrance circumference, to the large member circumference, the member's increasing surface being symmetric to the member's axis;

said member being mounted revolvably about said axis;

the center line of the increasing housing's interior surface having a radial distance from said axis of revolution;

means for revolving said member;

means for introducing plastic material in said processing space near said entrance circumference;

so that during each revolution every point of the revolving member interior surface undergoes a change in distance to the housing interior surface varying between a maximum and a minimum distance, thus subjecting the plastic material to a circular and spiral kneading and milling treatment.

2. Apparatus for processing plastic material as claimed in claim 1 wherein said increasing housing is connected near the large housing circumference to a decreasing housing having an interior surface symmetric to the middle line thereof with an interior circumference decreasing from said large housing circumference to the circumference of a discharge opening near the center of said decreasing interior surface;

said revolving member having a second, decreasing surface connecting to said large member circumference and surrounded by said decreasing interior surface in spaced relationship to define a processing space therebetween, the member's decreasing surface having a circumference decreasing from said large member circumference toward the member's axis, the member's decreasing surface being symmetric to the member's axis;

said middle line of the decreasing housing's interior surface having a radial distance from said axis of revolution in a direction diametral to the radial distance from said axis of revolution to the center line of the increasing housing's interior surface;

so that the area of smallest distance between the increasing surfaces of said revolving member and said increasing housing is always in diametral position to the area of smallest distance between the decreasing surfaces of said revolving member and said decreasing housing, thus compensating the effect of maximum pressure exerted near the area of smallest distance between the decreasing surfaces of said revolving member and said decreasing housing by the effect of maximum pressure exerted near the diametral area of smallest distance between the increasing surfaces of said revolving member and said increasing housing.

3. Apparatus for processing plastic material as claimed in claim 2 wherein
said axis of revolution coincides with said member's center line, and
said revolving member's large circumference is larger than said housing entrance circumference, and larger than the circumference of said discharge opening.

4. Apparatus for processing plastic material as claimed in claim 2 wherein
the increasing surfaces of said revolving member and of said increasing housing form with the center lines thereof smaller angles than the decreasing surfaces of said revolving member and said decreasing housing,
so that the plastic material is subjected to a processing treatment including a roll mill effect between said increasing surfaces, and is subjected to a processing treatment including the normal force effect between said decreasing surfaces.

5. Apparatus for processing plastic material as claimed in claim 2 wherein
the increasing surfaces of said revolving member and of said decreasing housing are parallel to each other, and
the decreasing surfaces of said revolving member and of said increasing housing are parallel to each other.

6. Apparatus for processing plastic material as claimed in claim 2 wherein
the increasing surfaces of said revolving member and of said increasing housing diverge from each other by an acute angle,
so that the diverging increasing surfaces exert a force on the plastic material in said processing space in the direction of divergence of said surfaces.

7. Apparatus for processing plastic material as claimed in claim 2 wherein
the decreasing surfaces of said revolving member and of said decreasing housing diverge from each other by an acute angle,
so that the diverging decreasing surfaces exert a force on the plastic material in said processing space in the direction of divergence of said surfaces.

8. Apparatus for processing plastic material as claimed in claim 2 wherein
said increasing and decreasing surfaces increase and decrease linearly so that they form substantially conical surfaces.

9. Apparatus for processing plastic material as claimed in claim 2 wherein
said surface of said increasing housing has a gradual transition to said surface of said decreasing housing, and
said increasing surface of said member has a gradual transition to said decreasing surface of said member.

10. Apparatus for processing plastic material as claimed in claim 2 wherein
said surfaces are provided with depressions extending below said surfaces, so that the plastic material is processed between said surfaces in varying material depths.

11. Apparatus for processing plastic material as claimed in claim 2, wherein
means are provided for axially moving the revolving member, the increasing and the decreasing housing relatively to each other, so that the spaced relationship between the revolving member and the housing interior surfaces can be varied and controlled.

12. Apparatus for processing plastic material as claimed in claim 2 wherein
said means for introducing plastic material comprise a barrel attached to said increasing housing near said housing entrance circumference, said barrel having an interior surface symmetric to the member axis;

a feed screw extending through said barrel, having helical flights, and being connected to said revolving member near said member entrance circumference,
so that plastic material is conveyed by said feed screw through said barrel into the processing space between said revolving member and said increasing housing.

13. Apparatus for processing plastic material as claimed in claim 2 wherein
the central portion of said member's decreasing surface is mounted separately rotatable about an axis of rotation coincident with said revolving member's axis of revolution;
means for rotating said central portion independently, so that said central portion can be rotated at a rate different from the revolving member's increasing and peripheral decreasing surfaces.

14. Apparatus for processing plastic material as claimed in claim 2 wherein
an extrusion screw extends from said member's decreasing surface near the axis thereof through said discharge opening, said extrusion screw having an axis coinciding with said member's axis, and an extrusion barrel is attached at the one end thereof to the decreasing housing, and has an interior surface communicating with said discharge opening, so that plastic material processed between said decreasing housing and said member's decreasing surface is extruded by said extrusion screw through said discharge opening and said extrusion barrel.

15. Apparatus for processing plastic material as claimed in claim 14 wherein said extrusion barrel has a center line coincident with the axis of said extrusion screw;

the extrusion barrel having an interior surface decreasing radially in axial direction in a tapering surface;

said extrusion screw having a taper in spaced relationship and tapering correspondingly to said tapering surface;

means for axially moving said revolving member with said extrusion screw, and said decreasing housing with said extrusion barrel relatively to each other, so that the spaced relationship between said revolving member and said decreasing housing and between said taper and said tapering surface can be varied and controlled simultaneously.

16. Apparatus for processing plastic material as claimed in claim 13 wherein said central portion of said member has attached an extrusion screw coaxial to said central portion and extending through said discharge opening and in an extrusion barrel attached to said decreasing housing.

17. Apparatus for processing plastic material as claimed in claim 2 wherein said revolving member has a cylindrical bore coaxial with said member's axis, having a radial distance from the center line of said increasing housing and from the middle line of said decreasing housing;

an injection screw mounted rotatably in and axially movable through said bore and said discharge opening;

means for rotating and axially moving said injection screw.

18. Apparatus for processing plastic material as claimed in claim 2 wherein said revolving member has a cylindrical bore coaxial with said member's axis, having a radial distance from the middle line of said decreasing housing;

an injection piston being mounted in and axially movable through said bore and through said discharge opening;

means being provided for axially moving said injection piston.

19. Apparatus for processing plastic material as claimed in claim 2 wherein an opening is provided in the housing interior surface near said large housing circumference for devolatilizing gases and vapors, and for introducing additives to the plastic material to be processed.

20. Apparatus for processing plastic material as claimed in claim 3 wherein the increasing surfaces of said revolving member and of said increasing housing form with the center lines thereof smaller angles than the decreasing surfaces of said revolving member and said decreasing housing;

said means for introducing plastic material comprising a barrel attached to said increasing housing near said housing entrance circumference, said barrel having an interior surface symmetric to the revolving member's axis, and a feed screw extending through said barrel, having helical flights and being connected to said revolving member near said member entrance circumference;

an extrusion barrel attached at the one end thereof to and coaxial with said revolving member, having an interior surface communicating with said discharge opening on said one end and an extrusion opening on the other end, and decreasing radially in axial direction in a tapering surface;

an extrusion screw extending from said member's decreasing surface through said discharge opening, said extrusion screw's axis being coincident with the member's axis, the extrusion screw having a taper in spaced relationship and tapering correspondingly to said tapering surface;

means being provided for axially moving said revolving member with said feed screw and said extrusion screw, said increasing housing, and said decreasing housing with said extrusion barrel relatively to each other, so that the spaced relationship between said increasing housing surface and said member increasing surface, between said decreasing housing surface and said member decreasing surface, and between said tapering surface and said taper can be varied and controlled simultaneously.

21. Apparatus for processing plastic material as claimed in claim 4 wherein the increasing surfaces of said revolving member and said increasing housing diverge from each other by an acute angle, and the decreasing surfaces of said revolving member and said decreasing housing diverge from each other by an acute angle;

said surfaces being provided with depressions extending below said surfaces;

said means for introducing plastic material comprising a barrel attached to said increasing housing near said housing entrance circumference, said barrel having an interior surface symmetric to the member axis, and a feed screw extending through said barrel, having helical flights, and being connected to said revolving member near said member entrance circumference;

means being provided for axially moving said revolving member with said feed screw, said increasing housing with said barrel, and the decreasing housing relatively to each other, so that the spaced relationship between the revolving member and the housing interior surfaces can be varied and controlled;

said revolving member having a cylindrical bore coaxial with said member's axis, having a radial distance from the middle line of said decreasing housing;

an injection screw mounted rotatably and axially movable through said bore and said discharge opening;

means for rotating and axially moving said injection screw.

22. Apparatus for processing plastic material comprising a decreasing housing having an interior surface symmetric to the center line of said housing, and decreasing from a first circumference, the large housing circumference, to the circumference of a discharge opening near the center of said decreasing interior surface;

a revolving member surrounded by said housing interior surface in spaced relationship to define a processing space therebetween, said member having a surface decreasing from a first circumference, the large member circumference, toward the center line thereof, the member's surface being symmetric to the axis thereof;

said member being mounted revolvably about said axis having a radial distance to the member's center line;

means for revolving said member;

means for introducing plastic material in said processing space near said large circumference, so that during each revolution every point of the revolving member undergoes a change in distance to the decreasing housing surface varying between a maximum and a minimum distance, thus subjecting the plastic material to a circular and spiral kneading and milling treatment.

* * * * *